United States Patent [19]

Mohler et al.

[11] Patent Number: 4,479,225
[45] Date of Patent: Oct. 23, 1984

[54] COMBINED LASER RESONATOR STRUCTURE

[76] Inventors: Galen E. Mohler, 1450 Ben Roe, Los Altos, Calif. 94022; Royal D. Peterson, 14105 Birmingham Hwy., Alpharetta, Fulton County, Ga. 30201

[21] Appl. No.: 393,040

[22] Filed: Jun. 28, 1982

[51] Int. Cl.³ .............................................. H01S 3/082
[52] U.S. Cl. ....................................... 372/97; 372/53; 372/93; 372/107; 372/65; 372/71; 350/288
[58] Field of Search ...................... 372/97, 53, 54, 107, 372/65, 93, 92, 71; 350/288

[56] References Cited

U.S. PATENT DOCUMENTS 3,970,963 7/1976 Chester .................................. 372/97
4,241,319 12/1980 Papayoanou .......................... 372/97

Primary Examiner—William L. Sikes
Assistant Examiner—Léon Scott, Jr.
Attorney, Agent, or Firm—C. Michael Zimmerman

[57] ABSTRACT

A laser construction is described having a single resonator structure for both a dye laser optical cavity and one or more pump laser optical cavities. In the described embodiments, such resonator structure is formed principally from a plurality of parallel rods.

13 Claims, 12 Drawing Figures

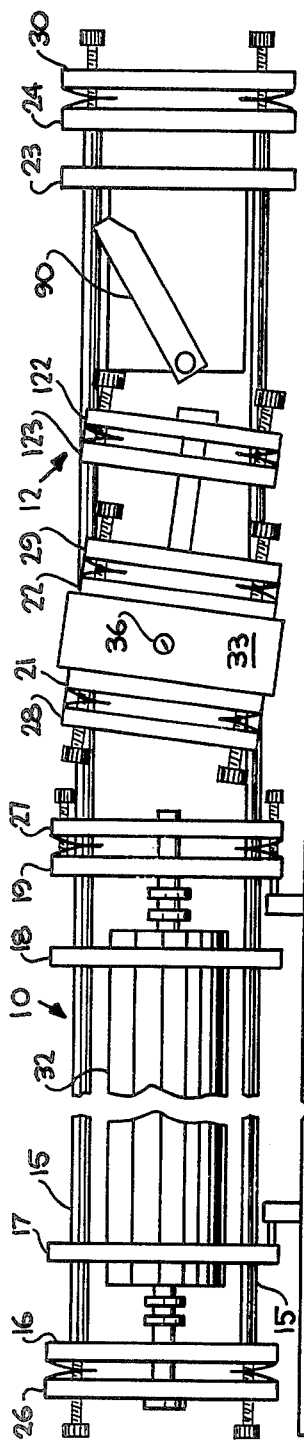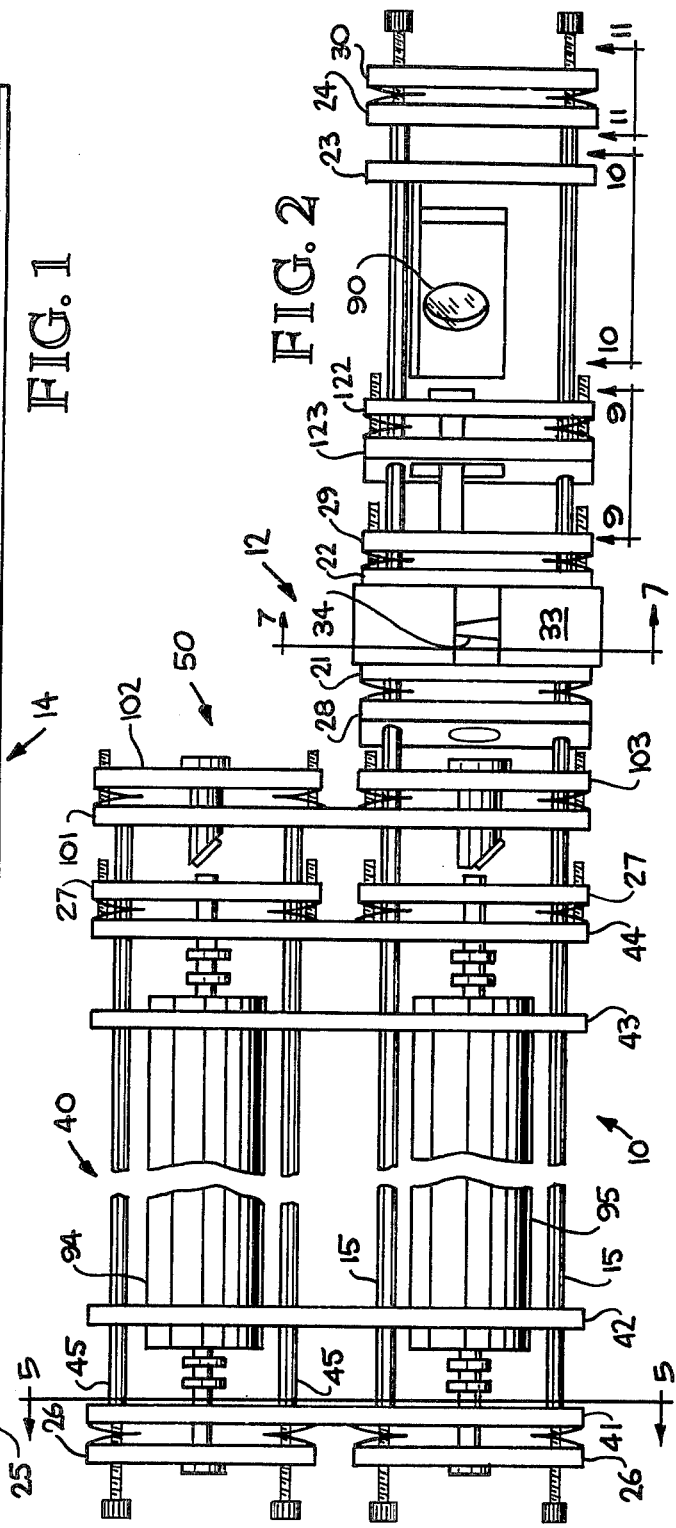

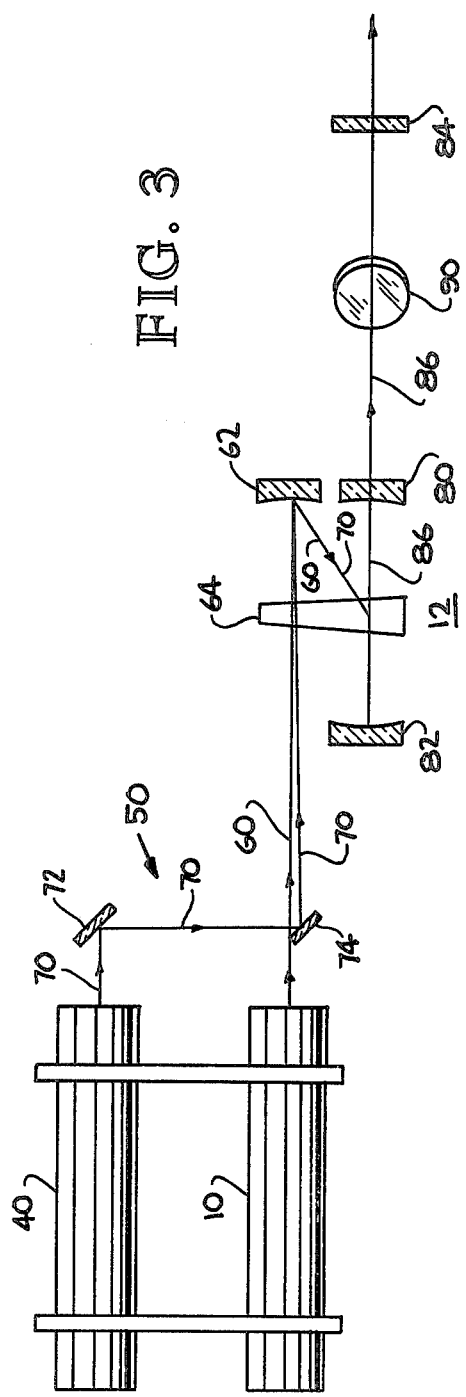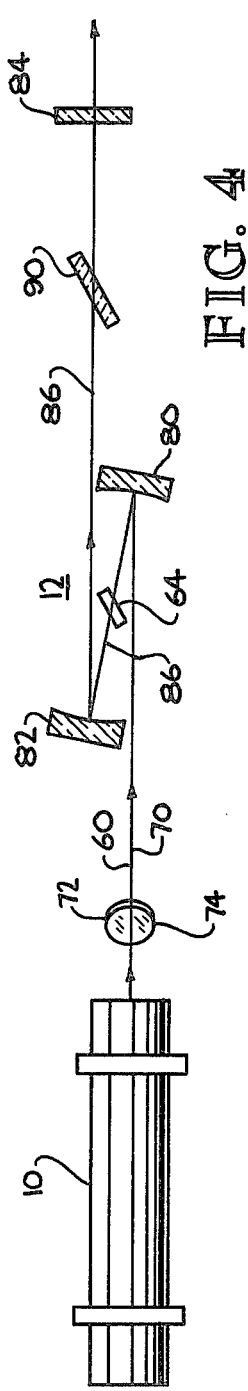
FIG. 3
FIG. 4

COMBINED LASER RESONATOR STRUCTURE

BACKGROUND OF THE INVENTION

1. Field of the Invention

This invention relates to lasers and, more particularly, to a laser construction which has at least two laser optical cavities complete with optical reflectors and means for supporting lasable media, on a single, mechanically integrated resonator structure.

2. Prior Art

In its basic aspects, a laser includes a lasable medium positioned between optical reflectors which resonantly reflect optical radiation emitted by the lasable medium back-and-forth through the lasable medium to produce stimulated emission of coherent optical radiation. The reflectors define a path therebetween for the resonant reflection, referred to in the art as the laser "optical axis"; and the reflectors, together with means for supporting the lasable medium along the optical axis, are referred to as the laser "optical cavity". Typically, one of the optical reflectors is partially transmissive and permits some of the coherent optical radiation to escape from the resonant optical cavity to thereby provide an output beam of coherent radiation.

It is important in achieving and maintaining appropriate lasing within the resonant optical cavity, that the reflectors be maintained in a predetermined and spaced-apart relationship with respect to each other, and that the position of the lasable medium relative to the optical axis be maintained. It should be appreciated that even slight changes in these relationships can result in serious output power losses, frequency changes, and the like. It has therefore become standard practice to provide a resonator structure which supports the mounts for the optical reflectors and the means for positioning the lasable medium. Such resonator structure is designed and fabricated to maintain the optical reflectors mounted thereto in a rigid positional relationship relative to each other and the lasable medium, despite variations in thermal conditions, limited vibrations, etc. Examples of resonator structures for ion gas lasers following particular designs are described in U.S. Pat. Nos. 3,864,029; 3,966,309; 4,143,339; and 4,201,951, all assigned to the assignee of the present invention, and the disclosures of which are hereby incorporated by reference. As described in those patents, the resonator structure design includes mounts for the optical reflectors and for the ion gas plasma tube maintained in a desired, predetermined relationship by a plurality (specifically three) metal alloy rods extending parallel to the optical axis of the laser and having a low coefficient of thermal expansion. One of these patents, No. 4,201,951, describes a gas ion laser having two separate plasma tube assemblies which are serially aligned with one another in one optical cavity, i.e., between a single set of optical reflectors.

Medical applications for lasers are numerous. Laser radiation is used in the detection and treatment of cancer. For example, a medical treatment utilizing a dye laser for the selective destruction of cancerous tissue is described on pages 130, 131 of an article in the May, 1982, issue of *Life Magazine*. A chemical called HPD is injected into a patient and selectively attaches to cancerous tissue. Red light from a dye laser is injected into the malignant tissue and strikes the HPD, which releases a form of oxygen which destroys the diseased cells. In other applications of dye lasers described in that magazine article, the red radiation from dye lasers is used to remove tumors of the mouth, larynx, bronchi, skin, and eyes. It should be readily apparent that these present uses and future uses of laser radiation will become more widespread as lasers become sufficiently reliable and simple to operate so that medical personnel can readily operate them in a clinical environment.

Many medical applications require radiation of a frequency which as a practical matter is only available from a dye laser. However, conventional dye lasers require a second laser for operation. That is, in order to make a dye lase, it must be irradiated with the output beam of a pump laser, such as a frequency-doubled YAG laser, an argon gas ion laser, or a copper vapor laser. Thus, two separate lasers must be provided for use of a dye laser. Because the beam of the pumping laser must be precisely directed to a location in the cavity of the dye laser in order to cause such dye laser to lase, a trained laser technician is almost mandatory before such a laser can be used. It will be appreciated that this has severely inhibited the use of the same in many environments, including medical environments. These problems are compounded when it is desired to increase the output of a dye laser by using more than one pump laser, with each precisely focused to a point in a dye laser stream.

SUMMARY OF THE INVENTION

The present invention is a laser construction having at least two laser optical cavities on a single resonator structure. Thus, a single laser is provided having two laser beams on separate optical axes which are maintained in a predetermined and rigid relationship to one another. Most desirably, one of the optical cavities includes means for supporting a dye laser medium on its optical axis and the other cavity has a pumping laser medium on its optical axis. With such an arrangement, the present invention enables the output of a dye laser to be obtained from a single laser construction which has optimized characteristics in terms of vibration and thermal performance. Such construction is free from potential mis-alignment forces applied either to the laser base plate or the laser cover. Specific embodiments of the invention use thermally stable INVAR rods rigidly fixed to substantial mounting plates to form a preferred type of resonator structure.

The invention contemplates each optical cavity having a resonator substructure on which are mounted the optical reflectors, or mirrors, defining the same and between which is the lasable material, such as an ionized gas or lasable dye. Means are provided for holding the resonator substurctures in fixed relationship to each other to form a single mechanically integrated resonator structure for the plural optical cavities.

The means for maintaining the resonator substructures in fixed relationship includes several alternatives. One such means includes a plurality of rods, such as INVAR rods, which extend between and are part of the two cavity resonator substructures. The rods are continuous or are formed from rod portions with corresponding abutting ends rigidly fixed together. Another means for maintaining the substructures together includes a plurality of rigid plates which are shared by both substructures and extend between the two to form an integrated resonator structure for both cavities.

BRIEF DESCRIPTION OF THE DRAWINGS

The accompanying drawings, which are incorporated in and form a part of the specification, illustrate preferred embodiments of the invention, and, together with the description, serve to explain the principles of the invention. In the drawings:

FIG. 1 is an elevation view of a preferred laser construction of the invention having a single resonator structure for a gas laser optical cavity for pumping a dye of a second optical cavity thereof;

FIG. 2 is a plan view of another preferred construction having a single resonator structure for two gas laser optical cavities providing pumping beams for pumping a dye of another, third optical cavity thereof;

FIG. 3 is a plan schematic view of the optical arrangement of the embodiment of FIG. 2 in which two gas laser optical cavities pump a dye laser optical cavity;

FIG. 4 is an elevational schematic view of the arrangement of FIG. 3;

DETAILED DESCRIPTION OF THE PREFERRED EMBODIMENT

Figure 5:
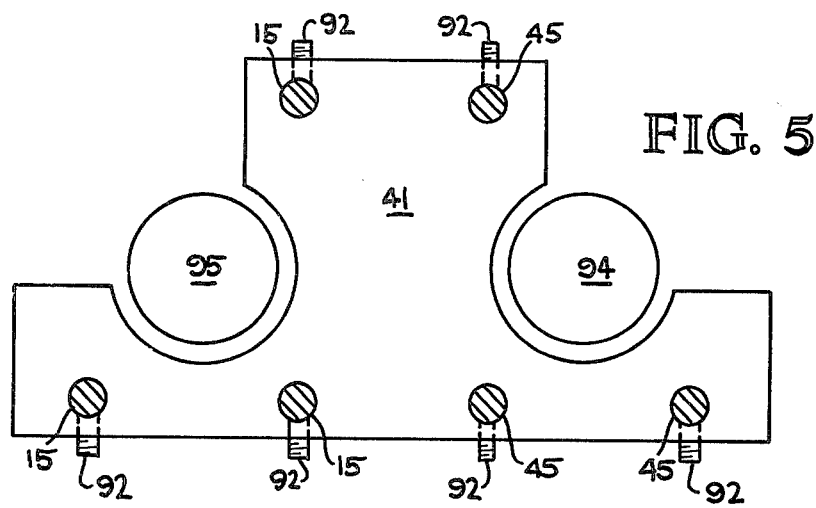
FIG. 5 is a sectional view taken along section line 5—5 of FIG. 2 showing an elongaged end plate of a resonator for holding the resonator substructures of two adjacent laser optical cavities together.

Reference is now made in detail to the preferred embodiments of the invention which illustrate the best mode presently contemplated by the inventors of practising the invention, preferred embodiments of the apparatus of which are shown in the accompanying drawings.

Referring to the drawings, FIG. 1 shows a laser construction employing a single resonator structure for both a gas ion pumping laser optical cavity and for a dye laser optical cavity. That is, a gas laser optical cavity 10 produces an output beam which serves as the pumping beam for the dye laser optical cavity 12. Each of such optical cavities is mounted on a single resonator structure, generally referred to by the reference numeral 14. As is clear in FIGS. 1 and 2 of the drawing, this single resonator structure is in the general form of an open framework made up of spaced longitudinal members joined together by spaced transverse members, both of which will be further described in the material which follows. The result is that the optical axes of the two optical cavities are always maintained in a fixed, predetermined relationship. Moreover, the output beam of the pumping laser optical cavity not only is directed to a predetermined location as will be discussed within the dye laser optical cavity, it maintains such positional relationship in spite of vibrations, thermal changes, and other movements which otherwise could be expected to cause misalignment problems.

The integrated resonator structure 14 includes as shown in FIG. 1, a plurality of spaced transverse members in the form of three rods 15 which are rigidly secured together by, and fixed to, support plates 16-19 and 21-24, inclusive, in the manner described in the above patents. In the preferred embodiment, the rods are formed from a material having a low coefficient of expansion, such as is provided under the trademark INVAR, and are one-half inch in diameter.

The support plates 16, 17, 18 and 19, and the portions of the rods therebetween form a first portion of the resonator 14 which serve as a resonator substructure for the gas pump laser optical cavity 10. Similarly, the support plates 21, 22, 23 and 24 and the portions of the rods therebetween, form another resonator substructure for the dye laser optical cavity 12. Both of the resonator substructures are part of the integrated resonator structure 14. Such integrated structure is supported by a base plate 25 through conventional connectors as, for example, illustrated and described in U.S. Pat. No. 4,201,951, to permit differential thermal expansion. It should be noted that whereas in a single laser optical cavity construction the connectors extend between the base plate and the two support plates which coincide with plates 17 and 18 of the present arrangement, in the plural optical cavity arrangement of this invention, the connectors extend between the base plate 25 and the support plates 17 and 19. The subresonator structure for the dye laser optical cavity 12 is cantilevered over such base plate.

The support plates 16, 19, 21, 22 and 24 are mounts for suspending adjustably mounted mirror-tuning plates 26, 27, 28, 29, and 30 in the manner described in U.S. Pat. No. 3,966,309. Suitable mirrors are fixed to such mirror-tuning plates.

The plates 17 and 18 support means along the optical axis of its cavity for providing a lasable medium. More particularly, the mirrors mounted on the tuning plates 26 and 27 define an optical cavity having an optical axis passing through a plasma tube assembly 32 which contains an argon lasable gas mixture. Similarly, the mirrors mounted on tuning-plates 28, 29 and 30 define the optical axis for the dye laser optical cavity 12 which, in turn, includes a dye nozzle mounting block 33 for a nozzle 35 (FIG. 7) that defines a flowing dye stream 34 appropriately intercepting such optical axis. Thus, the block 33, which is also fixed to rods 15, supports means in cavity 12 for providing a lasable medium. A suitable flowing dye solution therefore is pumpable to an inverted population state by the pump beam radiation issuing from the gas laser optical cavity 10. In the embodiment of this invention shown in FIG. 1, a beam issuing from a single gas ion optical cavity with approximately 7.5 watts output optical power has pumped a rhodamine 6G dye in cavity 12, with the result that an output beam was produced from the dye laser optical cavity having a wavelength between 570 and 645 nm and a maximum output beam power of approximately 1.95 watts.

FIG. 2 shows another embodiment of the invention which provides increased pumping power by providing two gas laser optical cavities on the same resonator structure used for the dye laser optical cavity. That is a second gas laser optical cavity 40, similar to cavity 10, is provided to double the pumping radiation fed to the lasable dye provided within cavity 12. The same reference numerals are used to indicate component parts common to the configurations of FIGS. 1 and 2. The support plates 16, 17, 18 and 19 of the FIG. 1 embodiment are respectively replaced in the FIG. 2 embodiment by elongated support plates 41, 42, 43 and 44 which are shared by the resonator substructures for the cavities 10 and 40. That is, these plates rigidly tie rods 45 of the resonator substructure for the second gas optical cavity 40, and tie the same to the rods 15 of the resonator substructures for the first two optical cavities 10 and 12 to form an integrated resonator structure for all three cavities. Combiner optics 50, shown in more detail in FIG. 6, directs the output of the second pumping laser optical cavity 40 to the dye of cavity 12. The additional pumping radiation provided by the second gas cavity 40 proportionately increases the output radiation of the dye cavity 12.

FIGS. 3 and 4 are schematic views included to illustrate the beam path of the laser construction shown in FIG. 2. The output radiation of the first gas laser optical cavity 10 is represented by ray 60 and is directed to a focusing mirror 62 where it is focused onto a stream of dye solution represented at 64 in the dye laser optical cavity. The output radiation of the second gas laser cavity 40 is represented by ray 70 which is directed to a first turning mirror 72 of the beam combiner optics 50 and then to a second turning mirror 74. The second turning mirror 74 of the beam combiner optics 50 directs the reflected ray 70 at an angle of approximately one degree with respect to ray 60, towards the focusing mirror 62 where it is focused onto the dye stream 64 at the same spot at which the ray 60 is focused. Fully reflective mirrors 80 and 82 and a partially reflective output mirror 84 define the ends of the dye laser resonant cavity 12 and an optical axis along which the dye laser beam, represented by the ray 86, travels. A tuning birefringent filter plate 90 is set at Brewster's angle and is rotatable to obtain a desired output wavelength.

The components of the dye laser optical cavity of the FIG. 1 embodiment are the same in both type and position as described above for the FIG. 2 embodiment. Moreover, the beam path for the embodiment of FIG. 1 is the same as that described above for the beam path of embodiment of FIG. 2, except, of course, the beam 70 and its various path reflections are not included.

FIG. 5 shows in more detail the elongated support plate 41 of the FIG. 2 embodiment, which plate basically is the same as the elongated support plates 42–44 of such figure. As can be seen from such figure, these plates serve both as means for securing together rods of the resonator substructures and also as means for tying together such substructures and the side-by-side optical cavities in a fixed relationship to form a unitary, mechanically integrated resonator structure. That is, the INVAR rods 15 and 45 of the two substructures pass through apertures in the elongated plates as shown with respect to plate 41 and are fixed in position by set screws 92 and an appropriate adhesive. The plasma tube assemblies 94, 95 are aligned on the optical axes of the adjacent cavities generally parallel to the rods 15 and 45.

Figure 6:
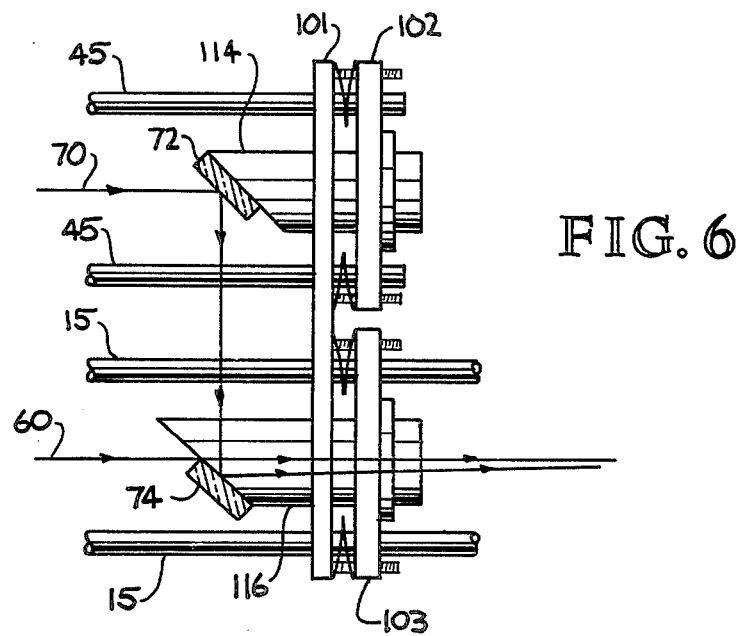
FIG. 6 is an enlarged sectional view of the beam combiner of the laser construction shown in FIG. 2.

FIG. 6 illustrates in more detail the beam combiner optics assembly 50. A mounting plate 101 is rigidly secured to the rods 15 and 45, from which tuning plates 102 and 103 are suspended in the same manner as the tuning plates 27. The tuning plates in turn support mounting brackets 114 and 116 for the respective turning mirrors 72 and 74.

Figure 7:
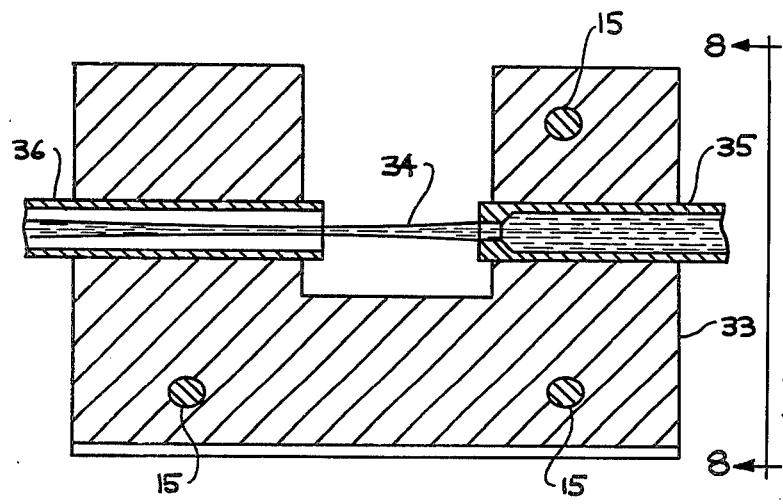
FIG. 7 is an enlarged sectional view taken along section line 7—7 of FIG. 2 showing the dye stream mounting block.
Figure 8:
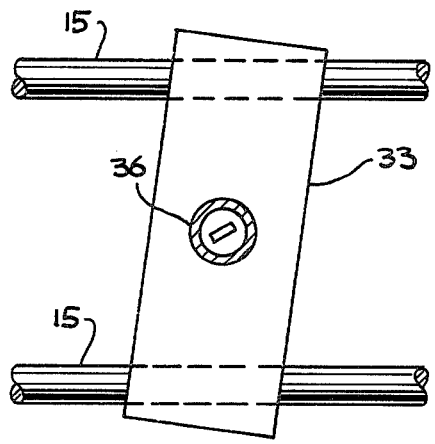
FIG. 8 is a side view of the FIGS. 1 and 2 construction, taken along lines 8—8 of FIG. 7.
Figure 9:
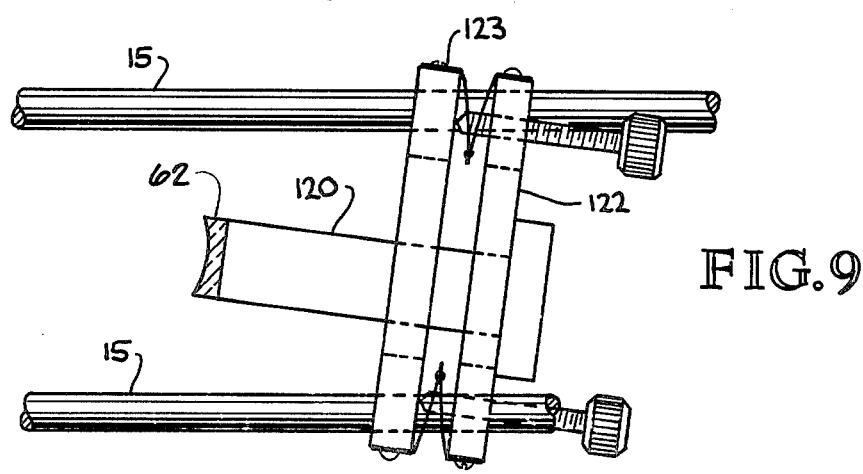
FIG. 9 is an elevation view taken at section lines 9—9 of FIG. 2 showing the mounting for a mirror which focuses the pump optical cavity output beam into the dye stream of the dye laser optical cavity.
Figure 10:
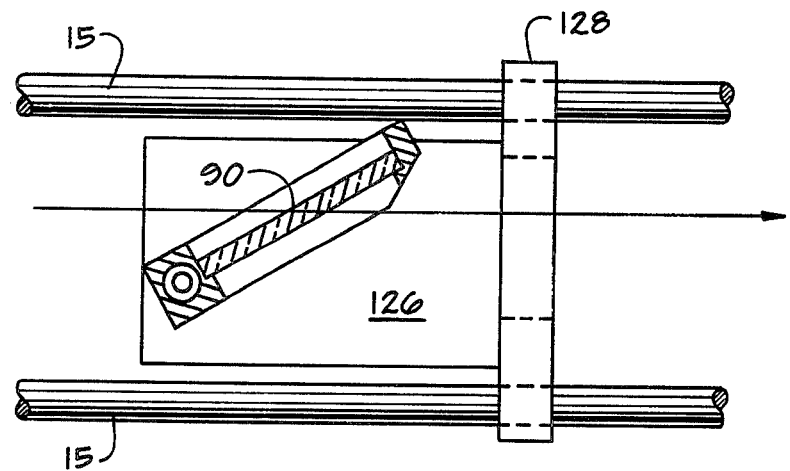
FIG. 10 is an elevation view taken at lines 10—10 of FIG. 2 showing the birefringent filter mounting.
Figure 11:
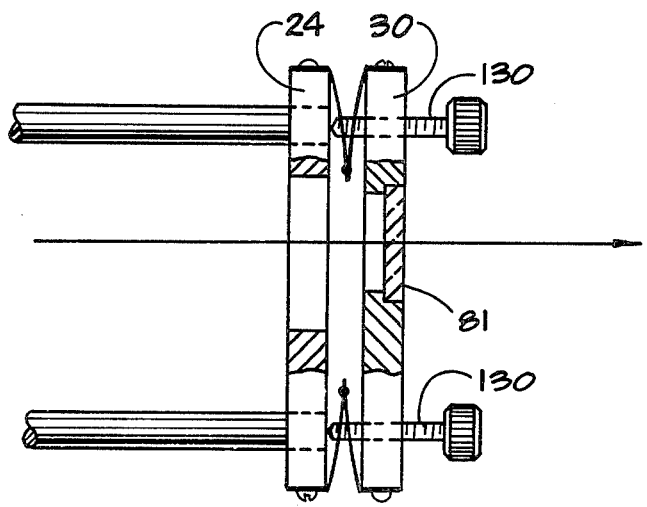
FIG. 11 is an elevation view taken at lines 11—11 of FIG. 2 showing the output mirror mounting for the dye laser optical cavity.

FIGS. 7 and 8 show the mounting block 33 for the dye laser nozzle-collector assembly in more detail. While for simplicity these views and the views of FIGS. 9–11 are taken from the FIG. 2 embodiment, the corresponding constructions of the FIG. 1 embodiment are the same. The dye stream 34 is formed by passing a lasable dye solution under pressure through the nozzle 35 to thereby form a jet into which the output radiation of one or more gas cavities is focused as described previously. A collector tube 36 which leads to a dye solution recirculator (not shown) is positioned by block 33 to catch stream 34.

FIG. 9 shows the pump beam focus mirror 62 mounted in the dye laser optical cavity, mounted near the end of a focus mirror holder arm 120. The arm 120 extends from an adjustably positionable focus mirror tuning plate 122. Such tuning plate is adjustably suspended by a configuration of the type disclosed in U.S. Pat. No. 3,966,309, from support plate 123 which is fixed with respect to the resonator structure rods 15. The mirrors 80 and 82 for the dye optical cavity are similarly mounted (sans an arm comparable to arm 120) on tuning plates 28 and 29 respectively suspended from support plates 21 and 22.

The mounting for the rotatably tunable birefringent filter 90 is shown in more detail in FIG. 10. Such filter is fixed with respect to the resonator in the dye optical, by being mounted on a support bracket 126 extending rigidly from a support plate 128 which is in turn fixed on the rods 15. A micrometer screw adjustment mechanism is provided for an operator to rotate the filter plate 90 to obtain a desired output wavelength from the lasing dye.

FIG. 11 illustrates the tuning plate 30 for the output mirror 84 suspended from resonator structure support plate 24. The orientation of plate 30 and, hence, of mirror 84 is adjustable with the tuning screws 130 shown.

Figure 12:
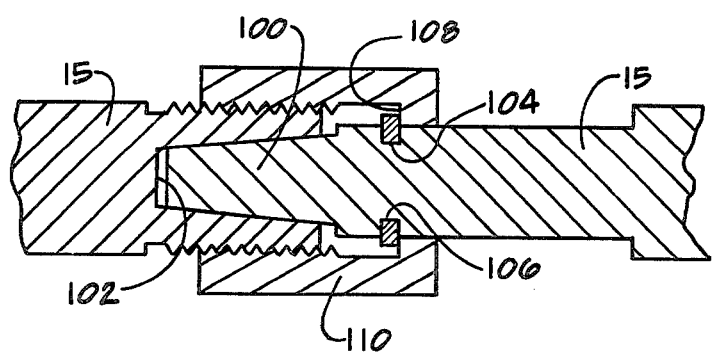
FIG. 12 is a sectional view showing a mechanism for rigidly securing together abutting ends of rods of two resonator substructures.

While in the embodiments described the colinear resonator substructures share integral rods 15, this is not necessary. That is, two aligned substructures can be provided with independent rods which can be secured together to form the unitary resonator structure. FIG. 12 shows a mechanism for securing in an end-to-end relationship, two rod portions of separate substructures. The end of a rod 15 of one substructure has a socket 102 which is engaged by a cooperable chuck extension 100 projecting from the end of a corresponding rod of the other substructure. A circumferential groove 104 formed near the end of the rod of the second substructure positions snap-ring 106 which serves as a stop for an interior shoulder 108 of a coupling ferrule 110 slideably mounted on the end of such rod. The ferrule 110 has internal threads which engage with external threads formed on the rod of the first substructure.

The corresponding rod portions of the two substructures are colinearly aligned and coupled together at their ends using the ferrules 110 as described above. Thus, a resonator substructure for a gas laser optical cavity can be rigidly connected to the resonator substructure of a dye laser optical cavity to form a single, mechanically integrated resonator structure for the two cavities.

It should be appreciated that providing two or more optical cavities on a single integrated resonator as contemplated by the invention, will considerably reduce instabilities and misalignment caused by shock, vibration, and thermal fluctuations. The invention therefore eliminates the need for highly skilled technicians to be available for alignment and adjustment to maintain satisfactory operation of any laser system which requires two or more lasing optical cavities. This is particularly advantageous and important when one of the optical cavities is a dye laser cavity and the other cavity is a laser cavity which must be aligned therewith for pumping. In this connection it should be noted that the pumping laser cavity and the dye laser cavity could be maintained by a single resonator in a predetermined, side-by-side relationship, with mirrors directing the pump beam appropriately into the dye laser optical cavity.

The foregoing descriptions of preferred embodiments of the invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims and their equivalent language.

What we claim is:

1. A laser construction comprising:
    a first laser optical cavity which includes a plurality of spaced optical reflectors which define a first optical axis, and means for supporting a lasable medium along said first optical axis;
    a second laser optical cavity which includes a second plurality of spaced optical reflectors which define a second optical axis, and means for supporting a lasable medium along said second optical axis; and
    a single resonator structure upon which said optical reflectors of both said cavities are fixedly mounted to maintain said optical axes in a predetermined and rigid relationship to one another, said resonator structure comprising a framework having a plurality of spaced longitudinal members joined together by a plurality of spaced transverse members.

2. The laser construction of claim 1 wherein said first laser optical cavity produces a dye laser pumping beam and the lasable medium of said second optical cavity is a dye, further including means on said resonator structure for directing the output beam of said first laser optical cavity into said second laser optical cavity at a predetermined location for irradiating a lasable dye medium therein.

3. The laser constructon of claim 2 wherein said single resonator structure maintains said first and second laser optical cavities in an end-to-end relationship with respect to one another.

4. The laser construction of claim 1 further including a third laser optical cavity having a third plurality of spaced optical reflectors which define a third optical axis and means for supporting a lasable medium along said third optical axis, the optical reflectors of said third optical cavity also being mounted on said single resonator structure to maintain said third optical axis in a predetermined and rigid relationship to said first and second optical axes.

5. The laser construction of claim 4 wherein said first and third laser optical cavities respectively produce dye laser pumping beams and the lasable medium of said second optical cavity is a dye, and means are fixedly mounted on said resonator structure for directing both of the output beams of said respective first and third optical cavities to a predetermined location in said second optical cavity for irradiating a lasable dye medium therein.

6. The laser construction of claim 1 wherein said single resonator structure comprises:
    first and second resonator substructures respectively having said first and second laser optical cavities mounted thereupon; and
    means for securing together said first and second resonator substructures to thereby form said single resonator structure.

7. The laser construction of claim 6 wherein each of said resonator substructures is formed from a plurality of parallel rods rigidly fixed to plates which extend therebetween, and wherein said means for securing said substructures together includes means for rigidly securing together abutting ends of corresponding rods of said substructures.

8. The laser construction of claim 1 wherein said longitudinal members comprise a plurality of parallel rods and said transverse members comprise a plurality of plates extending between and rigidly fixed to said rods.

9. A laser construction having at least two laser optical cavities comprising:
    a first laser optical cavity means for producing a first dye laser pumping beam, having a first resonator substructure mounting a first set of opposed optical reflectors defining a first optical axis and means for supporting a lasable medium along such axis;
    a second laser optical cavity means having a second resonator substructure mounting a second set of opposed optical reflectors defining a second optical axis and means for supporting along said second axis a lasable dye medium which when irradiated by said pumping beam dye laser provides a dye laser output beam; and
    means for combining the resonator substructures into a single resonator structure maintaining said pumping beam directed to a predetermined location in said second cavity for irradiating a lasable dye medium therein.

10. The laser construction of claim 9 wherein each of said resonator substructures includes portions extending beyond the optical cavity defined thereby and said combining means includes cooperable means on said portions for securing the resonator substructures in fixed relationship to define said single resonator structure.

11. The laser construction of claim 10 wherein the portion extending beyond each of the resonator substructures includes a plurality of rods for abutting in end-to-end relationship with corresponding rods of the other resonator substructure, and said cooperable means is for securing together abutting ends of corresponding rods to form said single resonator structure.

12. The laser construction of claim 9 further including a third laser optical cavity for producing a third dye laser pumping beam, having a second resonator substructure mounting a third set of optical reflectors defining a third optical axis, and means are provided for combining the resonator substructure of said third laser optical cavity with said resonator substructures of said first and second laser optical cavities to form a single resonator structure maintaining the pumping beams of said first and third laser optical cavities directed to a predetermined location in said second laser optical cavity for radiating a lasable dye medium therein.

13. The laser construction of claim 12 wherein each of said resonator substructures is formed from a plurality of parallel rods rigidly fixed to support plates which extend therebetween, and said resonator structure maintains said first and third laser optical cavities alongside one another and includes at least one support plate rigidly fixed to rods defining said first and third laser optical cavities to provide said single resonator structure.

* * * * *